3,364,271
PREPARATION OF HALOPROPADIENES

Robert W. Gallant, Plaquemine, La., assignor to The Dow Chemical Company, Midland, Mich., a corporation of Delaware
No Drawing. Filed Dec. 20, 1965, Ser. No. 515,200
7 Claims. (Cl. 260—654)

This invention relates to processes for isomerizing 1-halo-2-alkynes to 1-halo-1,2-alkadienes:

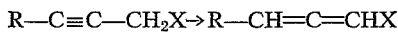

$$R-C\equiv C-CH_2X \rightarrow R-CH=C=CHX$$

wherein R is H or an inert group, such as lower alkyl, particularly methyl, and X is a halogen, preferably Cl or Br. In the preferred embodiments of the invention, R in the above formulas is hydrogen and the process thus produces a 1-halopropadiene from propargyl halide. Since the other embodiments involve compounds that are homologs or analogs of propargyl halides and halopropadienes, respectively, and can be regarded as substituted propargyl halides and substituted halopropadienes, respectively, the generic terms "propargyl halide" and "halopropadiene" as used herein shall be understood to include not only the respective prototype compounds but also the substituted compounds as set forth above.

Heretofore halopropadienes have been known only as laboratory curiosities because no practical method for their production in commercial quantities was known. Chloropropadiene has been made in small quantity and low yield by the isomerization of propargyl chloride by contacting it in the liquid phase with cuprous chloride (Jacobs and Brill, J. Am. Chem. Soc., 75, 1314 (1953)). Even after a 5-day reaction period the conversion was only 15%. Such a process is obviously impractical for large-scale use.

According to the present invention, propargyl halide is quickly and efficiently isomerized to a halopropadiene by passing it in vapor form at a temperature of about 100–400° C. over a cuprous halide catalyst.

The catalyst can be used as such but is preferably deposited on an inert support, such as alumina, sand crushed firebrick, silica gel or the like. The concentration on the support is not critical and may vary from less than one percent to 100%. Generally, the most practical concentration is about 10–30%. Such supported catalysts are easily made by impregnating the support material with an aqueous solution of cuprous halide preferably the chloride, and then drying the impregnated material. Any cupric salt in the catalyst is easily reduced to the cuprous salt by passing a highly halogenated compound, such as trichloropropene, over the catalyst at about 150° C.

The process of the invention is conveniently carried out by passing the propargyl halide through a bed of the catalyst maintained at reaction temperature. For such embodiment the catalyst is most conveniently packed in an elongated reaction zone. The propargyl halide is continuously passed into one end of the zone and the products are passed out at the other end, from which they are conducted to suitable condensers, separators, etc., by which the product is separated and purified. Unconverted propargyl halide is ordinarily recycled to the reactor.

As a matter of convenience, the process is usually operated at atmospheric pressure. However, higher or lower pressures can be used, so long as the reactant is maintained in the gaseous condition; i.e., pressures should not be sufficient to liquefy the propargyl halide. If superatmospheric pressure is used at high reaction temperatures, e.g., above 350° C., the reactant should be diluted with inert gas to reduce the danger of explosion.

The reaction time is not critical and can be varied widely. If excessively short, e.g., less than one second, the conversion of propargyl halide is quite low, though the yield of halopropadiene, based on material consumed, is high. On the other hand, if the reaction time is excessively long, e.g., more than one minute, the conversion is high but the yield may be substantially reduced because of polymerization, decomposition, or other secondary reactions of the halopropadiene. Generally, it is preferred to choose conditions such that conversions are less than 100% in order to obtain higher yields.

The practice of the invention is illustrated by the following examples.

In the first series of experiments, the reactor was a 2-inch I.D. glass tube having a 10-inch length packed with catalyst and heated to reaction temperature. The feed, propargyl chloride (1-chloro-2-propyne) was vaporized in a preheater and the vapors were passed through the reactor at a rate such that the contact time was 4 seconds. The effluent was passed to an efficient condenser and the condensate was anlyzed for propargyl chloride and 1-chloropropadiene. From these analyses the conversions and yields were calculated. The results of some typical experiments are shown in the following table.

TABLE I

| Example | Catalyst | Temp., ° C. | Conversion, percent | Yield, percent |
|---|---|---|---|---|
| 1 | 20 wt. percent CuCl on firebrick. | 250 | 1 | 100 |
| 2 | ----do---- | 300 | 17 | 100 |
| 3 | ----do---- | 370 | 25 | 99 |
| 4 | Firebrick only | 350 | 0 | 0 |

In a second series of experiments, the reactor was a stainless steel tube, 0.25 inch in inside diameter, having a length of 8 inches packed with unsupported (i.e., 100%) CuCl. The 1-chloro-2-propyne was diluted 3:1, by volume, with helium and fed at a rate such that the contact time in the reactor was about 2 seconds. For comparison, some runs were made with not catalyst (empty tube). Results are shown in the following table.

TABLE II

| Example | Catalyst | Temp., ° C. | Conversion, percent | Yield, percent |
|---|---|---|---|---|
| 5 | No | 331 | 1 | 0 |
| 6 | No | 418 | 100 | 0 |
| 7 | Yes | 150 | 16 | 94 |
| 8 | Yes | 200 | 37 | 87 |
| 9 | Yes | 250 | 46 | 86 |
| 10 | Yes | 320 | 60 | 91 |
| 11 | Yes | 400 | 78 | 84 |

In a manner similar to that described above, other propargyl halides are isomerized to the corresponding 1-halo-1,2-propadiene. Such propargyl halides include 1-bromo-2-propyne, 1-fluoro-2-propyne, 1-chloro-2-butyne, 1-bromo-2-pentyne, 1-fluoro-2-hexyne and, in general, the 1-halo-2-alkynes containing 3 to 6 or more carbon atoms, and the like.

I claim:

1. The process of converting a propargyl halide to the corresponding isomeric 1-halo-1,2-propadiene comprising contacting the propargyl halide in vapor form with a cuprous halide catalyst at a temperature of 100–400° C.

2. The process of claim 1 wherein the propargyl halide is a 1-halo-2-propyne.

3. The process of claim 2 wherein the 1-halo-2-propyne is 1-chloro-2-propyne.

4. The process of claim 1 wherein the cuprous halide is borne on a granular, inert, solid support.

5. The process of Claim 1 wherein the contact time is 1–60 seconds.

6. The process of claim 1 wherein the propargyl halide is diluted with an inert gas.

7. The process of claim 3 wherein the catalyst is cuprous chloride, the temperature is 150–400° C., and the contact time is 1–10 seconds.

References Cited

Gaudemar, M., Chemical Abstracts, 60, 2692–3 (1964).

LEON ZITVER, *Primary Examiner.*

J. BOSKA, *Assistant Examiner.*